ELECTRONIC SIGNAL RECORDING SYSTEM AND APPARATUS

Filed Jan. 16, 1948 4 Sheets-Sheet 1

INVENTOR.
C. W. Jacob
BY F. R. Marsh
ATTORNEY

ELECTRONIC SIGNAL RECORDING SYSTEM AND APPARATUS

Filed Jan. 16, 1948 4 Sheets-Sheet 2

INVENTOR.
C. W. Jacob
BY M. R. Marsh
ATTORNEY

INVENTOR.
C. W. Jacob
BY M. R. Marsh
ATTORNEY

ELECTRONIC SIGNAL RECORDING SYSTEM AND APPARATUS

Filed Jan. 16, 1948 4 Sheets-Sheet 4

INVENTOR.
C. W. Jacob
BY M. R. Marsh
ATTORNEY

Patented Dec. 11, 1951

2,577,894

UNITED STATES PATENT OFFICE 2,577,894

ELECTRONIC SIGNAL RECORDING SYSTEM AND APPARATUS

Carlyle W. Jacob, Rochester, N. Y.

Application January 16, 1948, Serial No. 2,624

35 Claims. (Cl. 346—75)

The present invention relates primarily to an electronic recording system and apparatus therefor, suitable for reproducing pictures, making sound records, and other purposes, and more particularly to a system and apparatus wherein electrical signals are recorded on a record receiving medium through the electronic control of one or more streams or jets of air or gas containing ink or other marking particles. The electrical signals recorded may be of any desired character and may, for example, represent sound or signals generated by scanning an original subject matter sheet so that a facsimile of such a sheet is reproduced.

It is one of the objects of the present invention to provide apparatus for controlling a stream or jet of air containing ink or like substance in accordance with electrical signals to produce a record of sound signals or the reproduction or a facsimile of a subject matter sheet, such as a picture, writing, map, sketch, drawing, etc., in accordance with signals generated by scanning the original subject matter sheet.

Another object of the present invention as outlined above resides in the controlling of a plurality of streams or jets of air containing ink or like substances either simultaneously or in definite timed relation with respect to one another.

Another object of the invention resides in a novel arrangement of controlling a stream or jet of air containing ink particles to selectively permit the ink particles to flow with the air and be deposited on the record receiving sheet or to be completely or partially precipitated therefrom.

In connection with the above, it is a still further object of the present invention to provide apparatus adaptable for use in conjunction with etching acids and paraffin and like substances to form printing plates.

Still another object of the invention is to provide apparatus of the above nature which will record fine lines with gradations in density and with extremely sharp definition.

The above and further objects of the invention relating to the details of various components of the apparatus employed to effect the above stated general objects will be more apparent in the following detailed description wherein reference is made to the accompanying drawings, in the latter of which:

Figures 1, 2, 3, 3A, 3B:
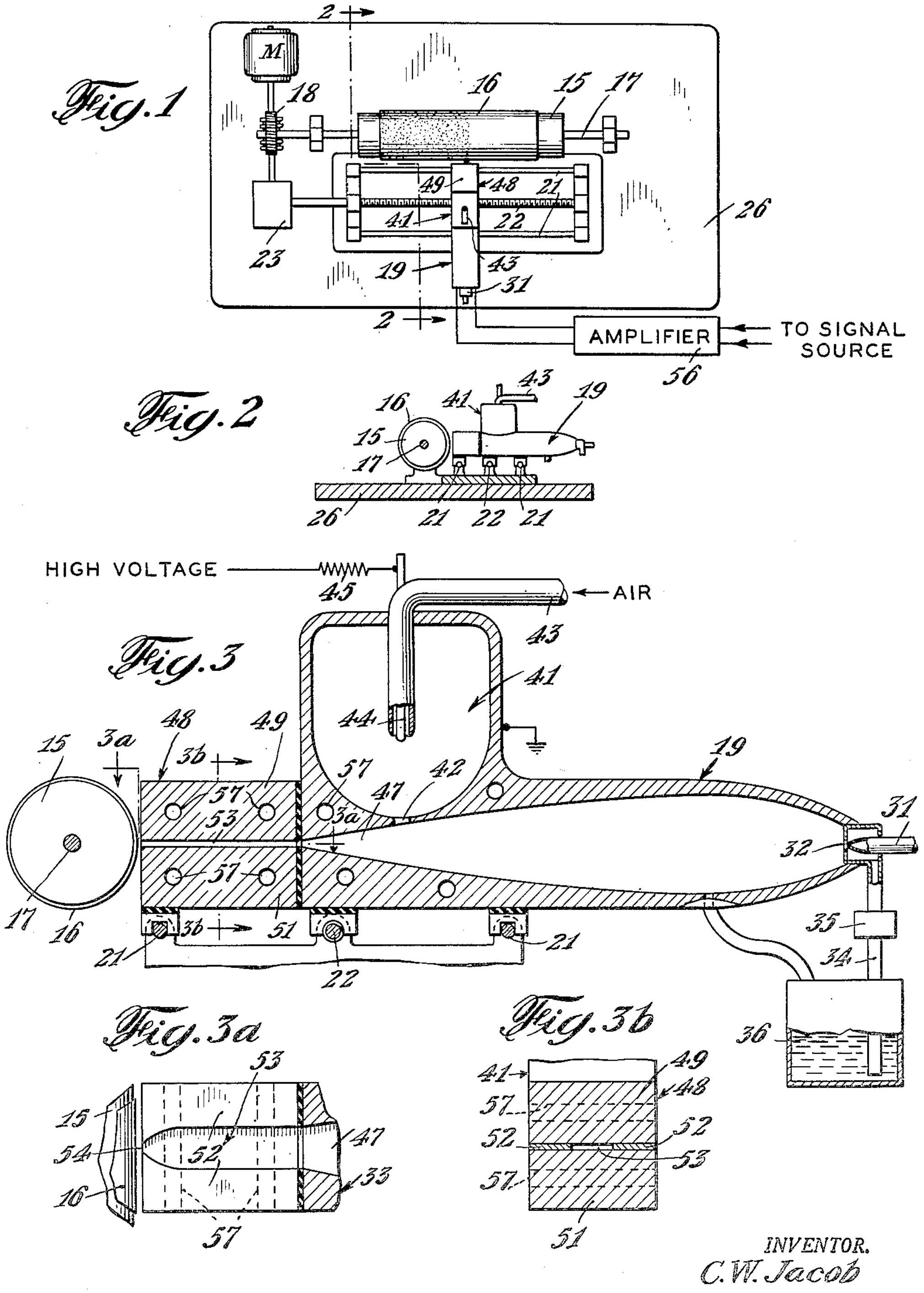
Fig. 1 is a plan view of a somewhat diagrammatic arrangement of an apparatus embodying the principles of the present invention.
Fig. 2 is a vertical sectional view taken on line 2—2 of Fig. 1.
Fig. 3 is a transverse vertical sectional view of what is hereinafter referred to as a single jet or duct recording head.
Figures 4, 5:
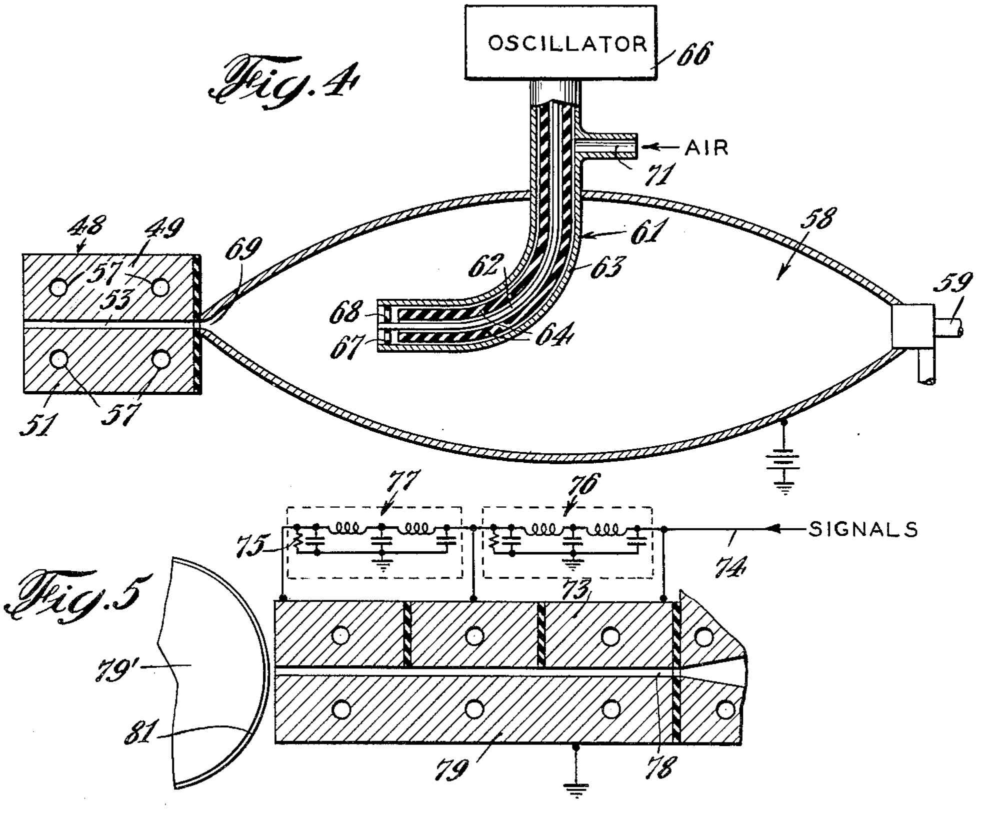
Figure 6:
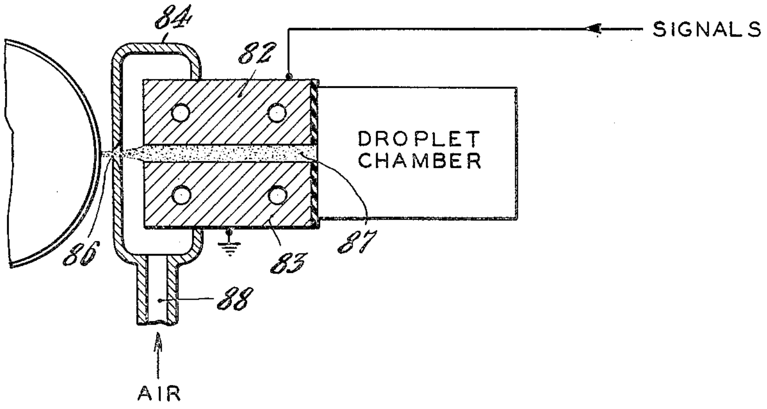
Figures 7, 8:
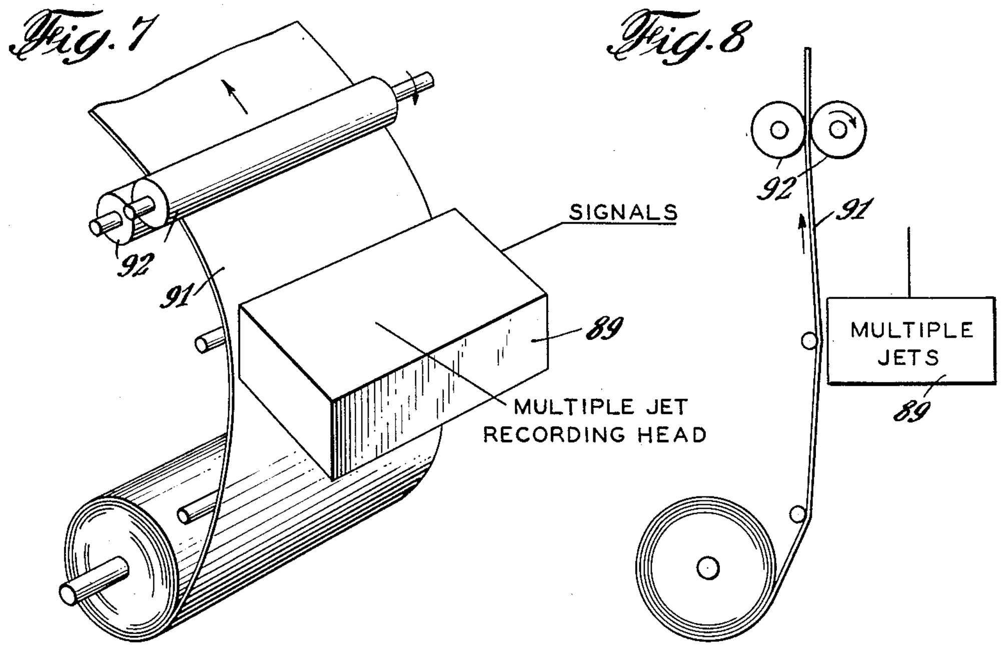
Figure 9:
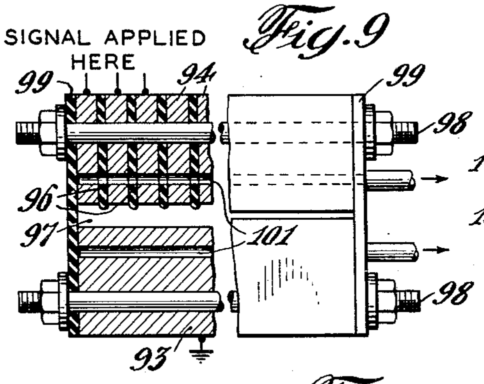
Figure 9B:
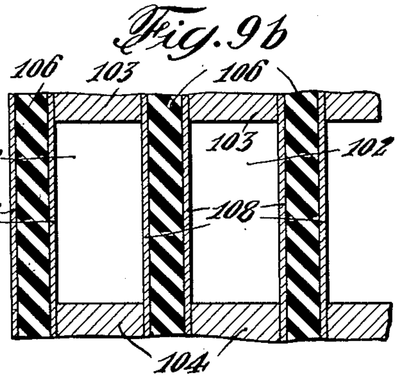
Figure 9A:
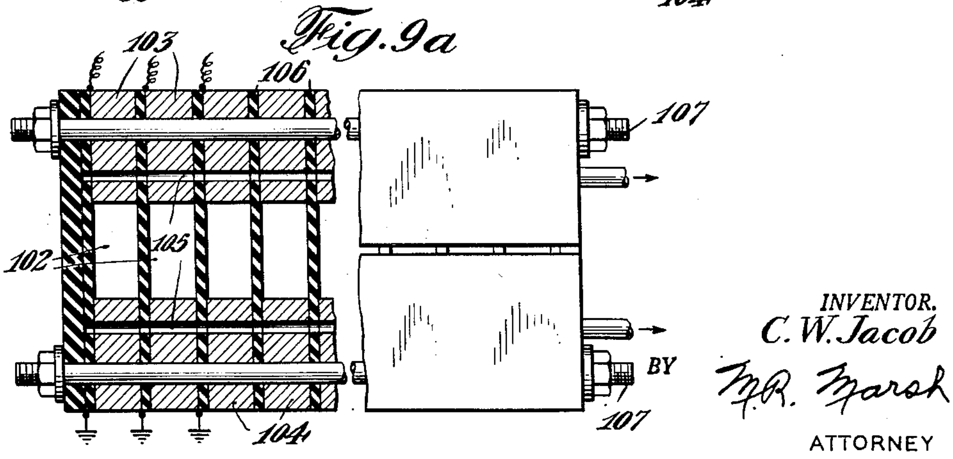
Figure 10:
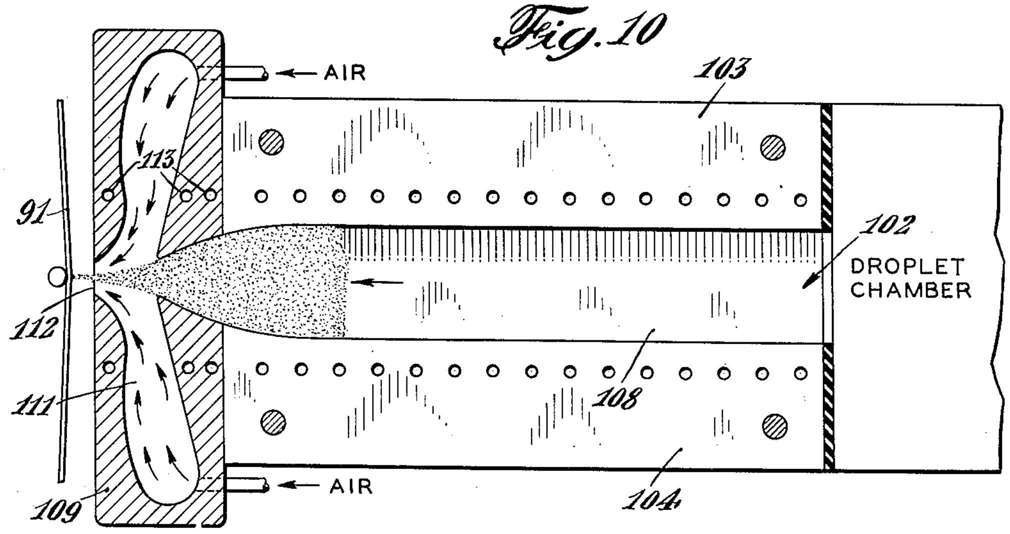
Figure 11:
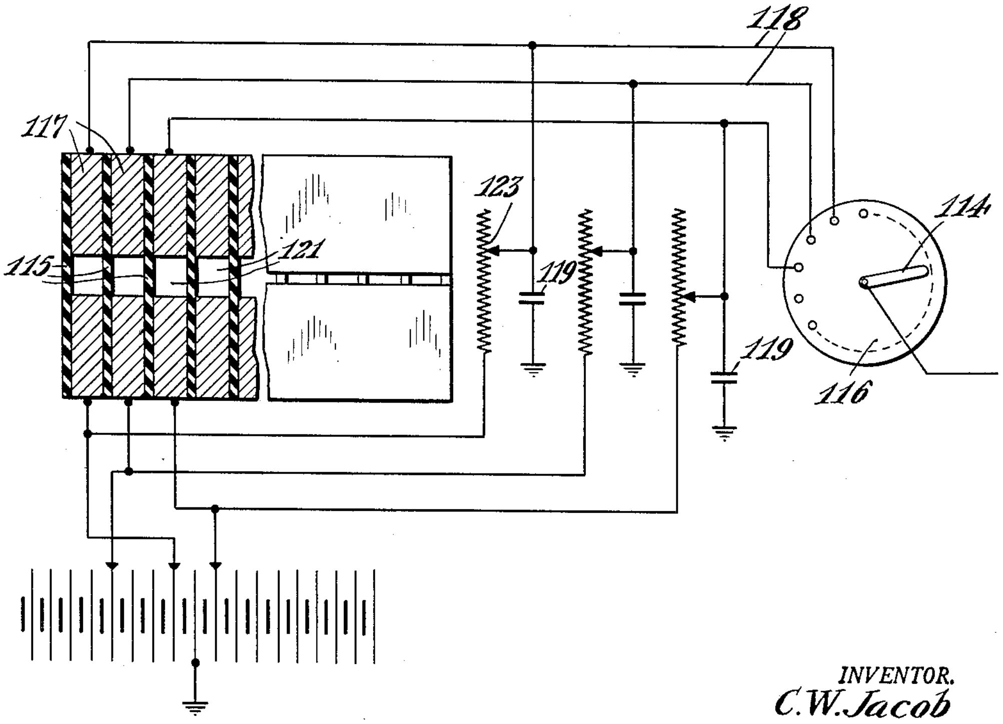

Fig. 3*a* is a fragmentary sectional view taken on line 3*a*—3*a* of Fig. 3;

Fig. 3*b* is a fragmentary sectional view taken on line 3*b*—3*b* of Fig. 3;

Fig. 4 is a modification of a so-called charging unit included in the recording head shown on Fig. 1;

Fig. 5 is a modification of a so-called precipitating unit of a recording head;

Fig. 6 is another modification of a precipitating unit of a recording head;

Fig. 7 is a diagrammatic representation of a recording device wherein so-called multiple ducts or jets are employed;

Fig. 8 is an end view of the apparatus of Fig. 7;

Fig. 9 is a detail sectional view of the precipitating unit of the so-called multiple duct or jet recording unit;

Fig. 9*a* is a detail sectional view of a modified multiple duct precipitating unit;

Fig. 9*b* is an enlarged detail view of a section of the precipitating unit of Fig. 9*a*;

Fig. 10 is a sectional detail view of a further modified multiple jet recording head; and Fig. 11 is a circuit diagram of the electrical connections and a distributor employed with the multiple jet recording head.

As will be obvious hereinafter, the features and principles of the present invention are applicable to many well known types of signal recording machines. In Figs. 1 and 2 of the drawings, for example, one modification of the invention is diagrammatically shown applied to a recorder of the type wherein a rotatable recording cylinder or drum 15 has wrapped therearound a record receiving or so-called recording sheet 16. The recording cylinder or drum 15 is suitably supported on a shaft 17 and is driven through appropriate gearing 18 from a motor M. The motor M may be of the well known synchronous type or any suitable speed controlled motor. In the arrangement shown in Figs. 1 and 2, a so-called recording head 19 of the present invention is adapted to move axially of the recording drum 15 as the latter rotates so that each elemental area of the record receiving sheet 16 on the drum is scanned or explored by the recording head. The recording head 19 is guided for movement relative to the drum on guide rods 21 and is moved by a lead screw 22 which may be driven from the motor M at the desired rate through gearing in a gear box 23. The various gearing employed may be such, for example, that the recording head 19 scans lines on the record receiving sheet 16 approximately one-hundredth of an inch apart, or one hundred lines to the inch, and obviously various other scanning speeds may be employed. The above described elements of the recorder are suitably supported and attached to the base 26. The recorder shown for illustrative purposes is adapted to be controlled, for example, by electrical signals derived from a photocell scanner in which a picture to be reproduced is mounted on a synchronously driven drum, as well known in the facsimile art.

Since mechanisms of the above type are well known and familiar to those versed in the art, a more detailed description of the various conventional elements thereof is unnecessary for illustrating the principles of the present invention, and it will be obvious that various other arrangements for scanning or exploring a record receiving or recording sheet may be employed, as for example, one wherein the recording head is stationary and the recording drum about which the sheet 16 is wrapped moves axially during rotation thereof. The principles of the invention are also applicable, as will be obvious, to recording on a relativeley narrow continuous strip such as a tape.

A major part of the present invention relates to the features of the above mentioned recording head 19. One modification of recording head, which is of the so-called single jet or duct type, is disclosed in Figs. 3 to 6, and a modified recording head, which is of the so-called multiple duct or jet type, is disclosed in Figs. 7 to 11. All the herein described types of recording heads consist primarily of means whereby ink or other substances such as etching acids are sprayed or directed onto a record receiving medium in accordance with and under the control of applied signals generated in any one of a number of different means such as by scanning an original subject matter or by sound pick-up means.

In accordance with the invention, the recording heads, both the multiple jet and the single jet types, employ a marking medium or fluid, such as ink, which is atomized by a gas, such as air, and a stream of the mixture thereof directed to the record receiving sheet. The marking fluid is preferably of a type which is free from dispersed pigment or solid particles. In accordance with signals applied to the recording head, the particles of the marking medium such as the ink in the stream flowing to the record receiving sheet are electrically precipitated in whole or in part so that certain desired spots or areas on the sheet will not have the marking medium deposited thereon, or a lesser amount of the marking medium will be deposited to give gradations in the density of recording.

In one embodiment of the recording head shown sectionally in Fig. 3, a jet of air enters the head from a tube 31 from a suitable supply source of substantially constant pressure, which may be in the neighborhood of ten pounds per square inch. Air from the nozzle 31 is directed through an opening 32 into a so-called droplet chamber 33 and in passing through the opening sucks ink up through tube 34 and filter 35 from an ink supply 36. The so-called droplet chamber 33 is relatively large and the ink sprayed therein by the air is in the form of a fine mist. Since the droplet chamber is relatively large, the atomized particles of ink will lose most of their high blast momentum and flow slowly through the chamber 33 as a fine suspension or mist.

The left hand sides of the droplet chamber 33 converge gradually to form a discharge port 47 so that the ink in the form of a mist acquires considerable velocity as it approaches discharge port 47. On the way to discharge port 47 the fast moving stream of mist passes under an opening 42 leading to the corona chamber 41. Extending into the top of corona chamber 41 is a duct 43 which may be of some material such as glass, and which supports therein a corona electrode 44 connected through a current stabilizing resistance 45 to a source of high negative voltage. The lower end of the corona rod terminates in a point adjacent the tip of duct 43. In view of the high negative potential applied to the corona electrode 44, the lower tip will discharge a stream of negative ions. Some of these ions will pass through the opening 42 in the lower portion of the chamber 41 to the opposite wall of the droplet chamber 33. The fine mist of ink passing under the opening 42 is exposed to this negative ion current and the ink droplets in the mist will be charged negatively. The current stabilizing resistance 45 prevents the corona discharge current from being erratic should the tip of the corona rod 44 become contaminated with marking particles. This insures that the number of negative ions leaving the corona tip region and flowing to the bottom of the corona chamber and through the mist will be substantially constant irrespective of the condition of the corona tip.

The high potential applied to the corona rod 44 is such that the ink particles or droplets issuing from the duct 47 are preferably charged to a maximum. A small flow of air through the tube 43 into the corona chamber 41 prevents contamination of the discharge end of the corona rod 44 by stray ink particles which may enter the corona chamber 41. With the apparatus functioning properly, ink particles do not enter the corona chamber.

The ink particles on issuing from the discharge or left hand end of the duct 47 and being charged negatively are directed into a precipitating unit indicated generally by reference numeral 48. The precipitating unit is formed of two plates or blocks of metal, an upper plate 49 and a lower plate 51, spaced apart vertically by means of two insulating sheets 52. The insulating sheets 52, Figs. 3*a* and 3*b*, together with the upper surface of the plate 51 and lower surface of the plate 49, form a passageway 53, the right hand end of which is in alignment with the left hand end of the exit port 47 of the droplet chamber 33. The insulating sheets 52 are shaped as shown in Fig. 3*a* to converge toward each other at the left hand end thereof to form a narrower discharge port or orifice 54 so that the air with or without the ink particles issuing from the passageway 53 is in the form of a fine stream focused at a point on the record receiving sheet 16. The focusing effect produces a higher concentration of the nonprecipitated marking particles over an area of the sheet which is substantially smaller than the cross-sectional area of the orifice 54. The lower precipitating plate 51 is kept at or near ground potential while the upper precipitating plate 49 has the voltage signals applied thereto. When the signal is zero, or the same as the potential at the lower plate, the ink droplets in the passageway 53 pass therethrough in full strength with but little loss in numbers by contact with the confining walls.

Accordingly the ink droplets issuing from the orifice 54 to the air stream will strike the record receiving sheet 16 on the drum 15 to produce a mark thereupon. If a negative potential signal is applied to the upper plate, an electric field will be created between the upper and lower plates, and the ink particles will be drawn downward. The percentage of particles deflected or drawn downward sufficiently to reach the lower plate and be precipitated thereon is determined by the magnitude of the signal, the greater the signal the greater the number precipitated. When the signal is at a maximum, all the ink particles are drawn out of or precipitated from the air stream to the lower plate, and consequently none of these ink particles will reach the record receiving sheet 16 and no mark will be produced thereon at this time. With the number of droplets precipitated on the lower plate a function of the strength of the signal applied to the upper plate, the amount of ink deposited on the record receiving sheet 16 can be controlled. Excellent results have been obtained in practice by varying the signal up to a maximum negative potential of eight hundred volts.

The signals before being applied to the upper plate 49 may first pass through an amplifier 56, Fig. 1, which serves to amplify the signals received from a signal transmitting or signal generating source. The signals may be of any of the well known types and for example may be sound generated signals or those generated by scanning an original subject matter sheet and varying in accordance with the tonal densities or markings on the original.

The signal amplifier 56 is preferably adjustable so that the output voltage may be made any desired function of the input voltage. The amplifier may or may not also include signal inverting means of a type generally employed in the art so that a positive or a negative reproduction can be made from a positive original, or vice versa.

The width of a mark produced on the subject matter sheet 16 is of course dependent upon the size of the discharge port or orifice 54 between the precipitating plates 49 and 51, and the insulating separators 52. With approximately five pounds per square inch pressure in the droplet chamber 33, the orifice 54 may be in the neighborhood of six thousandths of an inch square. It is to be understood that all specific data of this character is merely exemplary, and the invention is not limited in scope to such conditions or values.

As shown in Fig. 3, the precipitating unit 48 is insulatively separated from the droplet chamber 33. The slotlike opening 42 is preferably rather short longitudinally (a one-sixteenth inch length has been used successfully) to minimize the disturbing influence of the electric wind, produced by the corona discharge, on the flow of air and ink through the left hand portion of droplet chamber 33. The lateral dimension of the slot 42 should preferably be as large as the width of the portion of droplet chamber 33 directly beneath the slot. Obviously a number of corona points or rods such as 44 can be employed and they may be supplied by a positive potential instead of a negative potential.

The plates 49 and 51 of the precipitating unit 48 as well as parts of the charging or droplet chamber 33 are preferably made from a somewhat porous conducting material, such as powdered metal. These plates may also have holes such as 57 extending therethrough connected to a partial vacuum to draw off and remove any ink that may be deposited on the surfaces of these units to prevent contamination and clogging up of the surfaces. The outside areas of the porous material in contact with the atmosphere should preferably be painted to close the pores and contain the partial vacuum. The corona rod 44 may also be of porous metal to absorb stray ink droplets that may contact it. The unit of Fig. 3 is shown on guide rods 21 with the lead screw 22 arranged to impart movement thereto, all of which are insulatively separated from the unit, and flexible connections may be employed to provide for the electrical connections as well as the air pressure and vacuum connections.

The above description relates to the employment of a recording head wherein marking ink is used and obviously an etching fluid would be employed instead of the ink to produce an etching on a record receiving sheet or a heated liquid paraffin-like substance could be used to produce the desired results on the record receiving sheet 16. When ink, as well as when etching fluids, paraffin or other substances are employed, they should preferably have a rather low viscosity and a rather high electrical resistivity.

Fig. 4 illustrates a modified arrangement of charging the ink particles and includes a droplet chamber 58 into which the atomized ink is directed from the ink atomizing head 59. Into this droplet chamber 58 is projected a coaxial line 61 which includes a central conductor 62 and an outside conductor 63 separated from the inner conductor by insulation 64. The coaxial line 61 connects to a power oscillator 66 which by way of example may be of a frequency of one hundred megacycles or higher. The insulation 64 extends to within a few millimeters of the tip of the line 61 where are located a pair of ringed flanges 67 and 68, the flange 68 extending outwardly from the inner conductor and the flange 67 extending inwardly from the inside of the outer conductor. The flanges 67 and 68 at the end of the coaxial line increase the field strength between the inner and outer conductors thereof and cause breakdown of the air thereat and the production of ions. By tuning the oscillator and/or adjusting various complements of the coaxial line, a maximum voltage difference between the flanges 67 and 68 can be produced.

In order to disperse the ions formed between flanges 67 and 68 which otherwise because of their inertia tend to remain at the points generated, a positive potential may be applied to the shell of the droplet chamber 58. Accordingly negative ions produced at the end of the coaxial line will be drawn toward the shell of the droplet chamber 58 and negatively charge the ink droplets therein. The charged ink droplets in the droplet chamber 58 in the form of a mist are directed out through a passageway 69 at the left hand side thereof to a precipitating unit which may be similar in construction to the precipitating unit 48 of Fig. 3. In the same manner the ink droplets are selectively precipitated out of the air stream so that the record receiving sheet 16 is marked in accordance with the signals applied to the precipitating unit.

To prevent ink droplets from settling on the flanges 67 and 68 at the end of the coaxial line of Fig. 4 and contaminating same, a relatively small amount of clean air through a connection 71 is admitted to the coaxial line. The insulation 64 between the inner and outer conductors of the coaxial line fits somewhat loosely and permits the air to flow down the line and past the flanges 67 and 68 at the end thereof to thereby dispel and/or prevent the accumulation of ink droplets thereat.

The rate of precipitation of the particles is determined by two quantities: (1) the electric field between the precipitation plates, and (2) the electric charge on the particles. The latter is determined by the ionic charging field, that is, the electric field that forces the ions across the mist. This charging field is governed by the potentials on the charging electrodes which by definition are the potential elements that influence, by their potential, the charge put on the particles. In Fig. 3 the corona rod 44 is a charging elecrode and in Fig. 4 the shell of the droplet chamber 58 is a charging electrode. Varying the voltage on these electrodes varies the charge put on the particles.

There are three methods of using the recording apparatus of Figs. 1, 2, 3 and 4:

(1) The signals may be applied to the precipitating plate 49 and the potential of the corona rod 44 through resistance 45, or the shell of droplet chamber 58 maintained at a constant high charging value;

(2) The signals may be applied to the corona rod 44 through resistance 45 or to the shell of the droplet chamber 58 and the precipitating plate 49 maintained at a constant high precipitating potential;

(3) The signals may be applied simultaneously to both the precipitating plate 49 and the corona rod 44 through resistance 45, or the precipitating plate 49 and the shell of the droplet chamber 58.

While the first recited method is preferred, the other two are entirely practical.

The linear speed of flow of the atomized ink through the precipitating unit such as 48, Fig. 3, and the average distance between the grounded plate such as 51 and the plate 49 to which the signals are applied determines the minimum length of these plates since at maximum signal the ink droplets must be exposed to the plates a sufficient length of time for all the droplets to be completely precipitated. Accordingly, for a given set of conditions the length of the plates obviously is a determining factor in limiting the speed at which the signals can be modulated. By dividing the plate to which the signals are applied into a number of electrically separated parts, such as the plate 73 of Fig. 5 which is divided into three parts, and with the other factors and conditions remaining substantially constant, and passing the signals through delay circuits in the manner shown, they can be applied approximately three times as fast. In Fig. 5 the signals received over conductor 74 are applied directly to the right hand or first section of the upper precipitating plate 73 and then encounter a delay circuit represented diagrammatically by the rectangle 76. This delay circuit may be made up, for example, of chokes and condensers in the arrangement shown or by other well known arrangements. The output of the delay circuit 76 is applied to the center section of the precipitating plate 73 and to another similar delay circuit 77. The latter may include a terminal resistance 75 and the output thereof is applied to the left hand section of the precipitating plate 73.

The delay circuits are arranged in such a manner that the signal in passing therethrough is delayed for an interval substantially equal to the time required for a droplet to pass from the beginning of one section of the precipitating plate to the beginning of the next. With this arrangement each droplet in the precipitating duct or passageway 78 of Fig. 5 is acted upon by the desired signal during the entire time it is in the duct. Accordingly, when a droplet is being acted upon or deflected by a signal applied to the center section of the precipitating plate 73, for example, other droplets in the duct can be acted upon by signals applied to the left and right hand sections of the precipitating plate. The other elements of Fig. 5 are similar to those of the precipitating unit shown in Fig. 3 and include a lower plate 79 and a recording drum 79′ about which is wrapped the record receiving sheet 81. The charged ink droplets enter the duct 78 of the precipitating unit in Fig. 5 at the right hand end thereof and may be charged from a charging unit of the type disclosed in Figs. 3 or 4.

Fig. 6 shows a modification of the precipitating unit of a recording head wherein an air stream acts upon the droplet stream to narrow the same down and prevent contamination of the discharge port thereof by ink droplets. In this arrangement the upper precipitating plate 82 to which the signals are applied and the grounded lower precipitating plate 83 may be similar to those of Fig. 3, between which the stream of air with its entrained ink droplets is adapted to pass. Arranged around the left hand ends of the precipitating plates 82 and 83 is a shell 84 to which is admitted clean air from a source of suitable pressure. The shell 84 has a discharge orifice 86 with properly defined edges to permit a smooth flow of air therethrough without undue turbulence. The orifice 86 is in registry with the discharge port or orifice formed by the precipitating plates 82, 83.

As the stream of air with or without ink droplets, depending upon the signals applied to the plate 82, emerges from the duct 87, it is acted upon and compressed by the clean air entering the shell 84 through the supply connection 88 and narrowed down into a smaller stream. Accordingly the ink droplets in this stream are more concentrated, and finer and sharper recording on the record receiving sheet can be effected. Furthermore, the stream of air with its entrained ink droplets will not contact the edge of the orifice 86 to allow ink to accumulate thereat and vary the size of the orifice or be blown off at undesired times.

Each of the above modifications of the invention have been described as applied to a so-called single jet recording head wherein a single line is recorded at a time on the record receiving blank. By arranging a series of the jets in a line, a multiple or broad ribbon jet recording head is provided whereby recording may occur simultaneously over substantially the whole width of a recording blank or on a continuous web. Such a recording head is diagrammatically shown in Figs. 7 and 8 and indicated generally by reference numeral 89. In these figures a continuous strip of record receiving paper 91 is arranged to move relative to the multiple jet recording head by means of feed rollers such as 92, and since the multiple jet recording head 89 extends for the full width of the paper 91, no lateral movement of the latter is required.

In the sectional view, Fig. 9, of the precipitating unit of a multiple jet recording head there is included a common lower precipitating conducting plate 93, maintained at ground potential, and a plurality of individual upper precipitating plates 94. The upper plates 94 to which the signals are applied in a manner hereinafter pointed out are relatively thin and are separated from each other by thin insulating sheets 96.

The dimensions of the plates 94 and the insulating sheets 96 are such that the required number may be provided per inch. For example, if it is desired to record in lines one-hundredth of an inch apart, there will be a corresponding number of plates 94 per inch, and the total width of the recording head will correspond to the width of the recording blank such as 91 upon which recording is effected. Charged ink droplets entrained in an air stream are projected into the recording head in the form of a relatively thin but wide ribbon and into the precipitating unit through the duct 97. The insulating sheets separating the plates 94 may, as shown, project downwardly into the duct 97 although this is not necessary to assist in separating or defining the various longitudinal sections of the stream of charged ink droplets and maintain smooth and straight flow thereof through the duct 97. The plates 94 and plastic sheets 96 are strung on bolts, such as 98, and clamped together between insulating clamping plates 99, which also hold the lower precipitating plate 93 in fixed position relative thereto. As in the single jet precipitating unit, the plates 93 and 94 are preferably of porous or grooved material with a line of holes 101 therethrough connected to a partial vacuum to assist in soaking up and removing ink that has contacted the surfaces thereof. With the arrangement of Fig. 9 there are no interleaving partitions separating the ducts to occupy valuable space, and furthermore the lower plate 93 can be readily removed to facilitate cleaning it if necessary and inspection.

In the modification of the multiple jet recording head shown in Figs. 9*a* and 9*b* the stream of air entering the precipitating unit is divided into a number of fine streams that flow through parallel ducts 102. These ducts are defined at the top and bottom by upper and lower insulating plates 103 and 104 respectively and on the sides by laminated sheets 106. The plates 103 and 104 and the sheets 106 are clamped together by bolts 107 and may have holes 105 extending transversely therethrough connected to a partial vacuum. In accordance with this modification each side of the sheets 106 is coated with a relatively thin metal film 108, Fig. 9*b*. The coating is preferably thin so as not to add appreciably to the thickness of the plate. As indicated in Fig. 9*a*, the metal films on one side of the insulated sheets 106 are connected to ground while signals are applied to the metal films on the other sides thereof. Accordingly, in the arrangement shown in Fig. 9*b*, each of the ducts 102 will have one vertical side thereof grounded and individual signals applied to the other side to cause the ink droplets to be pulled sideways and be deposited on the grounded metal film. With this arrangement the cross-sectional area of the passageway 108 can be relatively large to permit the flow of a large volume of air and ink therethrough without exceeding the velocity at which eddying and turbulence set in. Furthermore, the arrangement of Figs. 9*a* and 9*b* permit the ducts 102 to be given considerable height without increasing the distance a marking particle has to travel for precipitation. In this manner the ducts are able to conduct considerably larger quantities of mist than would otherwise be possible and thereby produce more intensive recordings on the record sheet. Another advantage of the arrangement of Figs. 9*a* and 9*b* is the absence of cross-talk or interference from one duct to the other since there is no internal capacitance coupling from one signal electrode to the adjacent signal electrodes. In this arrangement the only internal capacitance that exists is from a signal electrode to ground and hence no cross-talk or interference between adjacent electrodes is possible.

Near the discharge end of the passageway 102, as shown in Fig. 10, the plates 103 and 104 converge to cause an increase in the velocity of the air with entrained ink droplets as it emerges therefrom. In association with the discharge port is a porous ceramic strip 109 having an opening 111 to which is admitted clean air from a suitable source. The ceramic strip 109 has a discharge orifice 112 extending the full width of the recording head and the air stream emerging from the passageway 102 is acted upon by the clean air and thinned down into a thin ribbon before it impinges upon the recording paper 91 located adjacent thereto. The ceramic strip 109 preferably has longitudinal holes 113 therein connected to a partial vacuum so that any ink deposited on the surface thereof is wtihdrawn. In the modification of Fig. 9*a*, ink deposited on the metal film 108 of the laminated sheets 106 is absorbed by capillary action into the plates 103 and 104. Preferably plates 103 and 104 are porous or have roughened or grooved sides to facilitate capillary action between them and interleaving sheets.

A distributor which may be employed in conjunction with a multiple jet recording head is shown in Fig. 11 wherein signals applied to the rotatable arm 114 of the distributor 116 are sequentially applied to corresponding conductive precipitating plates 117 interleaved by thin insulating sheets 115. The arm 114 of the distributor is synchronized with the transmitter so that each revolution of the arm corresponds to one line of scanning and each upper precipitating plate 117 is connected to a corresponding point on the distributor. Connected to each of the conductors 118 leading from a point on the distributor to its associated precipitating plate 117 is an individual relatively small condenser 119. When the arm 114 contacts a point of the distributor, the associated condenser 119 and precipitating plate 117 are charged to a voltage corresponding to the signal received at that time and the condenser holds this voltage until the brush again makes contact with this point at which time a new signal voltage is applied. Since ink droplets are precipitated in the ducts or passageways 121 from the air stream in accordance with the signals applied to the upper plates 117 thereof, the number of ink droplets that reach the recording paper are thereby controlled.

To compensate for slight discrepancies in the physical dimensions of the elements defining the precipitating ducts such as 121, Fig. 11, which would cause precipitating of the ink droplets at different rates on a given signal voltage, the bottom conductive plates 122 of each duct are individually connected to an adjustable source of low potential.

Another manner of adjusting the mechanical differences in different ducts which would vary the rate of precipitation on a given signal is to bleed the lower plate potential such as 122 by a variable relatively high resistance 123. The bleeding of the charge on a condenser in this manner renders less of the signal effective to effect precipitation in the associated duct 121.

The terms "ink," "marking medium" and the like are used herein to refer not only to colored inks, dyes and similar fluids, but also any substance which will react with or deposit upon the recording sheet or surface to record electrical signals in desired form, such as paraffin, acids and many other substances.

While the invention has been shown and described in a preferred embodiment and a number of modifications thereof, it will be obvious that numerous other modifications may be made therein without departing from the spirit or essential attributes thereof. Accordingly it is desired that only such limitations be placed thereon as are imposed by the appended claims.

What is claimed is:

1. The method of recording received electrical signals which includes the steps of entraining a marking medium in a stream of gas, electrically charging the particles entrained in said stream, passing said stream through an electric field controlled in accordance with the received signals to correspondingly deflect or precipitate the particles of marking medium therefrom and directing the thus acted upon stream to a record receiving medium movable in a scanning movement relative to said stream where the non-deflected or non-precipitated particles mark the same.

2. The method of recording received electrical signals which includes the steps of forming a suspension consisting of electrically charged particles of a marking medium in a gas, forming said mixture into a stream narrow in at least one dimension and passing the same through an electric field controlled in accordance with received signals and deflecting or precipitating varying numbers of the particles from said stream in relation to the signals while in said field whereby the stream in leaving said electric field has marking particles entrained therein representative of the signals, and directing said stream to a receiving medium where the remainder of said marking particles are deposited.

3. In an electric signal recorder, a supply of a mixture of a gas and suspended particles of an ink, means for electrically charging the particles of said mixture, a record receiving medium, a duct from said supply of said mixture to a point adjacent said record receiving medium, means for establishing an electric field through said duct varied in accordance with received signals, and means including said variable electric field for deflecting or precipitating variable proportions of the particles of said mixture passing through said duct whereby the number of particles of said mixture per unit of volume passing through said duct and deposited on said receiving medium is varied.

4. In an electric signal recorder, means for supplying a mixture of gas and charged ink particles under pressure, a record receiving medium, a duct narrow in at least one dimension for conducting said mixture from said chamber to a point adjacent said record receiving medium, means for establishing a plurality of separate electric fields along said duct, said fields being varied in accordance with signals applied thereto, signal delay circuits, and means including said fields and said signal delay circuits to successively establish an electric field along said duct in accordance with a received signal so that a unit volume of said mixture is successively exposed to said fields to precipitate the particles thereof in accordance with a signal whereby the particles of a unit volume of said mixture directed to said record receiving medium and deposited thereon represent said signal.

5. In an electric signal recorder, means for forming a suspension consisting of particles of a marking medium in a gas, means for forming said mixture of gas and particles into a stream narrow in at least one dimension, means including an electric field and electrical charges on said particles to deflect varying numbers of the said particles from unit volumes of said stream in accordance with received signals whereby the number of particles in said unit volumes of said stream varies in a predetermined plan with respect to the received signals.

6. In an electric signal recorder having a recording head and a record receiving medium with said head and medium movable relative to each other, said head including means for forming a suspension of at least a predetermined concentration of particles of a marking medium in a gas, electrically charging the gas suspended particles and forming the mixture into a stream narrow in at least one dimension, an electric field varying in strength in accordance with received signals operative upon said stream, means including said field to precipitate said marking particles to vary the concentration thereof in the stream emerging from said field in accordance with received signals, and means for then directing said stream at said record receiving medium.

7. In an electric signal recorder, means for forming a suspension consisting of a mixture of electrically charged particles of a marking medium in a gas, means for passing said mixture in a thin broad ribbonlike stream through a precipitating unit, said unit including means for establishing a plurality of separate electric fields transversely across the width of said stream and means for varying in accordance with received signals the strength of each of said separate fields to varyingly precipitate from the transverse sections of said stream as said stream passes through said fields the marking particles thereof whereby the emergent stream on contacting a record receiving medium will mark the same in a manner to represent the received signals.

8. In an electric signal recorder, means for forming a thin broad ribbonlike stream of a mixture of electrically charged marking medium particles dispersed in a gas, a conducting surface confining one of the broad surfaces of said stream and a plurality of separate conducting electrode surfaces confining the other broad surface of the stream, means for applying received signals separately to the individual ones of said plurality of electrode surfaces for establishing a plurality of separate electric fields through separate longitudinal sections of said stream, and means including said fields to precipitate from corresponding longitudinal sections of said stream varying numbers of said marking particles.

9. The combination set forth in claim 8 wherein at least the first-named, common one of said conducting surfaces has small openings therein to permit escape or removal of the marking particles that come in contact therewith.

10. In an electric signal recorder, means for forming a stream, narrow in at least one dimension, of a mixture of electrically charged marking medium particles in a gas, means including a pair of conducting surfaces located on opposite sides of said stream and defining at least a part passageway for said stream, means including said surfaces for establishing variable electric fields for precipitating varying numbers of said particles from unit volumes of said stream onto one of said surfaces, means for varying said fields in accordance with received signals, and means including pores or passageways through or in at least one of said surfaces for absorbing and removing the particles of said marking mediums deposited thereon.

11. In an electric signal recorder, means for forming a stream, narrow in at least one dimension, of a mixture of electrically charged marking medium particles in a gas, a precipitating unit having a duct for said stream wherein said marking particles are precipitated in accordance with received signals, said unit having a discharge port for said stream, a source of gas under pressure and means including said last named gas for acting upon the emergent stream from said unit and further reducing the size thereof in at least one cross-sectional dimension.

12. In a device of the type described for deflecting marking particles from a stream of gas containing the same, said device having a pair of plates having conducting surfaces defining two walls of a duct for said stream, a pair of insulating members separating said plates and defining other walls of said duct, and means including the contour of the surfaces of said separating members defining surfaces of said duct for increasing the speed of flow of said mixture from said duct over the entrance speed of flow.

13. In an electric signal recorder, a mixture of a gas and dispersed particles of a marking medium, a source of ions produced by a high frequency electrical discharge, a direct current voltage to withdraw from said discharge ions of one polarity, and means including said ions and said direct current voltage for electrically charging the particles of said marking medium dispersed in said gas.

14. In an electric signal recorder, a mixture of a gas and dispersed particles of a marking medium, a source of ions, means including said ions for electrically charging the dispersed particles and means for selectively deflecting the charged particles from a stream of said mixture in accordance with received signals prior to the flow of said stream onto a relatively moving record receiving medium whereby elemental areas of said record receiving medium have varying numbers of said particles deposited thereon.

15. In an electric signal recorder, a mixture of a gas and dispersed particles of a marking medium confined in a reservoir and having a passageway therefrom to a discharge port, a stabilized corona discharge chamber having a corona electrode for producing ions, an opening from said corona chamber to said passageway to permit flow of ions therefrom to electrically charge the suspended particles of said mixture and means for selectively deflecting the charged particles from a stream of said mixture in accordance with received signals prior to the flow of said stream onto a relatively moving record receiving medium whereby elemental areas of said record receiving medium have varying numbers of said marking particles deposited thereon.

16. The combination of claim 15 and including a flow of gas containing no marking particles over said corona electrode to prevent contamination of the surfaces thereof by stray ones of said marking particles.

17. In an electric signal recorder, means for forming a mixture of electrically charged particles of a marking medium dispersed in a gas into a broad ribbonlike stream, means to direct said stream into a precipitating unit, said unit including means for establishing a plurality of separate electric fields transversely along the width of said stream, means for varying in accordance with received signals the strength of said separate fields to varyingly precipitate from the transverse sections of said stream as said stream passes through said fields the marking particles thereof whereby the emergent stream on contacting a record receiving medium will mark the same in a manner to represent the received signals, and means for electrically compensating for physical differences in the elements of said precipitating unit whereby equal signals causes substantially equal precipitation of the particles in each of the transverse sections of said stream.

18. In an electric signal recorder, a mixture of particles of a marking medium disposed in a gas, means for forming said mixture into a stream narrow in at least one dimension, means to electrically charge said particles by ions, a precipitating unit having a duct for said stream, and means for establishing electric fields in said duct varying in strength in accordance with received signals, said fields acting upon said charged particles to precipitate varying numbers thereof from said stream.

19. In an electric signal recorder, a supply of a mixture of a gas and suspended particles of an ink, means for electrically charging the particles of said mixture, a record receiving medium, a duct from said supply of said mixture to a point adjacent said record receiving medium, means for establishing an electric field in said duct with lines of force substantially transverse to the length of said duct, said field varying in strength in accordance with received signals, and means including said variable electric field for deflecting or precipitating variable proportions of the particles of said mixture passing through said duct whereby the number of particles of said mixture per unit of volume passing through said duct and deposited on said receiving medium is varied.

20. In an electric signal recorder having a recording head and a record receiving medium with said head and medium movable relative to each other, said head including means for forming a suspension of at least a predetermined concentration of particles of a marking medium in a gas, electrically charging the gas suspended particles and passing the mixture as a stream into a duct narrow in at least one dimension, an electric field in said duct varying in strength according to received signals, means including said duct to precipitate said marking particles to vary the concentration thereof in the stream emerging from said duct in accordance with received signals, and means for then directing said stream at said record receiving medium.

21. In an electric signal recorder, a mixture of a gas and dispersed particles of a marking medium confined in a reservoir and having a passageway therefrom to a discharge port, a corona discharge chamber having a corona electrode for producing ions, an opening from said corona chamber to said passageway to permit flow of ions therefrom to electrically charge the suspended particles of said mixture and means for selectively deflecting the charged particles from a stream of said mixture in accordance with received signals prior to the flow of said stream onto a relatively moving record receiving medium whereby elemental areas of said record receiving medium have varying numbers of said marking particles deposited thereon.

22. In an electric signal recorder, a mixture of a gas and dispersed particles of a marking medium confined in a reservoir and having a passageway therefrom to a discharge port, a corona discharge chamber having a corona electrode for producing ions, means to stabilize the electric current flowing to said corona electrode, an opening from said corona chamber to said passageway to permit flow of ions therefrom to electrically charge the suspended particles of said mixture and means for selectively deflecting the charged particles from a stream of said mixture in accordance with received signals prior to the flow of said stream onto a relatively moving record receiving medium whereby elemental areas of said record receiving medium have varying numbers of said marking particles deposited thereon.

23. In an electric signal recorder, a mixture of a gas and dispersed particles of a marking medium confined in a reservoir and having a passageway therefrom to a discharge port, a stabilized corona discharge chamber having a corona electrode for producing ions, an opening from said corona chamber to said passageway to permit flow of ions therefrom to electrically charge the suspended particles of said mixture, a flow of gas containing no marking particles into said corona chamber, means including said gas to prevent contamination of said corona electrode, and means for selectively deflecting the charged particles from a stream of said mixture in accordance with received signals prior to the flow of said stream onto a relatively moving record receiving medium whereby elemental areas of said record receiving medium have varying numbers of said marking particles deposited thereon.

24. In an electric signal recorder, means for forming a mixture of electrically charged particles of a marking medium disposed in a broad ribbonlike stream of a gas, means to direct said stream into a precipitating unit, said unit including means for establishing a plurality of separate electric fields transversely across the width of said stream, and means for varying in accordance with received signals the strength of said separate fields to varyingly precipitate from the transverse sections of said stream as said stream passes through said fields the marking particles thereof whereby the emergent stream on contacting a record receiving medium will mark the same in a manner to represent the received signals.

25. In an electric signal recorder, means for forming a mixture of particles of a marking medium disposed in a gas, means for forming said mixture into a broad ribbonlike stream, means to electrically charge said particles by ions from a high potential electrical discharge, a precipitating unit into which said broad ribbonlike stream of charged particles and gas are passed, said unit including means for establishing a plurality of separate electric fields transversely across the width of said stream, means for varying in accordance with received signals the strength of said separate fields to varyingly precipitate from the transverse sections of said stream as said stream passes through said fields the marking particles thereof whereby the emergent stream on contacting a record receiving medium will mark the same in a manner to represent the received signals, and means for electrically compensating for physical differences in the elements of said precipitating unit whereby equal signals cause the weight of the marking particles impinging per unit of time on the record receiving sheet from each transverse section of said stream to be substantially constant.

26. In an electric signal recorder, means for forming a mixture of particles of a marking medium disposed in a gas, means for forming said mixture into a broad ribbonlike stream, means to electrically charge said particles by ions from a high potential electrical discharge, a precipitating unit into which said broad ribbonlike stream of charged particles and gas are passed; said unit including means for establishing a plurality of separate electric fields transversely across the width of said stream, and means for varying in accordance with received signals the strength of said separate fields to varyingly precipitate from the transverse sections of said stream as said stream passes through said fields the marking particles thereof whereby the emergent stream on contacting a record receiving medium will mark the same in a manner to represent the received signals.

27. In an electric signal recorder, a supply of a mixture of a gas and dispersed particles of a marking medium, a passageway for said mixture from said supply to a discharge port, a corona electrode in a cavity communicating with said passageway and outside the direct path of said mixture, means including said electrode to electrically charge said particles as they move along said passageway, and other means along said passageway selectively operative under control of received signals to precipitate the charged particles from said mixture prior to the discharge of said mixture from said discharge port.

28. In an electric signal recorder, a supply of a mixture of a gas and suspended particles of an ink, means for electrically charging the particles of said mixture, a record receiving medium, a duct from said supply of said mixture to a point adjacent said record receiving medium, means for establishing an electric field in said duct varied in accordance with received signals, means including said variable electric field for deflecting or precipitating variable proportions of the particles of said mixture passing through said duct whereby the number of particles of said mixture per unit of volume passing through said duct and deposited on said receiving medium is varied, and means including small pores or passageways through or in the surfaces with which said mixture comes in contact for removing the marking particles from said surfaces.

29. In a device of the type described for recording electric signals, means for supporting a record receiving medium, a source of a mixture of electrically charged marking particles suspended in a gas under pressure, a duct or passageway from said source to a position adjacent said record receiving medium, means including electric fields operative on the stream of said mixture passing through said duct to selectively remove the marking particles therefrom in accordance with received electrical signals, and stream sharpening means including at least a portion of said duct for causing the marking particles emerging from said duct to be directed at a small spot on said recording receiving blank of smaller area than the cross-sectional area of the discharge orifice of said duct.

30. In a device of the type described for recording electric signals, means for supporting a record receiving medium, a source of a mixture of electrically charged marking particles suspended in a gas under pressure, a duct or passageway from said source to a position adjacent said record receiving medium, means including electric fields operative on the stream of said mixture passing through said duct to selectively remove the marking particles therefrom in accordance with received electrical signals, and means including a portion of said duct having at least two opposite walls converging toward the discharge orifice of said duct for focusing the marking particles of the emergent stream onto a spot on said record receiving medium of smaller area than the cross-sectional area of the discharge orifice of said duct.

31. In a signal recording device of the type described, a supply of a mixture of electrically charged marking particles suspended in a gas under pressure, means for supporting a signal receiving blank, a duct or passageway for a stream of said mixture communicating with said supply and having a discharge orifice adjacent said receiving blank, means for selectively removing varying numbers of the marking particles from said stream prior to the discharge from said orifice in accordance with received signals, and stream sharpening means associated with said duct for directing the non-removed marking particles of the emergent stream onto a small sharp focal spot on said blank of less area than the cross-sectional area of the discharge orifice.

32. In a signal recording device of the type described, means for supporting a signal-receiving blank, means for forming a stream of marking particles suspended in a gas, means for electrically charging the particles in said stream, means, comprising a duct, for conducting the stream of charged particles to a discharge orifice adjacent said receiving blank, means for establishing an electrical field in said duct varying in intensity in accordance with received signals, stream-sharpening means associated with said duct for directing the stream emerging from said orifice onto a small focal spot on said blank of less area than the cross-sectional area of said orifice, and means for moving said blank relative to said orifice in scanning relation.

33. In a signal recording device of the type described, means for supporting a signal-receiving blank, means for forming a stream of marking particles suspended in a gas, means for electrically charging the particles in said stream, means, comprising a duct, for conducting the stream of charged particles to a discharge orifice adjacent said receiving blank, means for establishing an electrical field in said duct varying in intensity in accordance with received signals, said duct having at least two opposite walls converging toward its discharge orifice for focusing the marking particles of the emergent stream onto a spot on said blank, and means for moving said blank relative to said orifice in scanning relation.

34. In a signal recording device of the type described, means for supporting a signal-receiving blank, means for forming a stream of marking particles suspended in a gas, means for electrically charging the particles in said stream, means, comprising a duct, for conducting the stream of charged particles to a discharge orifice adjacent said receiving blank, means for establishing an electrical field in said duct varying in intensity in accordance with received signals, and signal delay means for controlling the time of effectiveness of the signals along different parts of the length of said duct to compensate for the time required for movement of the stream through said duct.

35. In a signal recording device of the type described, means for supporting a signal-receiving blank, means for forming a stream of marking particles suspended in a gas, means for electrically charging the particles in said stream, means, comprising a duct, for conducting the stream of charged particles to a discharge orifice adjacent said receiving blank, means for establishing an electrical field in said duct varying in intensity in accordance with received signals, said duct having at least one side which is porous for absorbing marking particles which are deposited thereon.

CARLYLE W. JACOB.

REFERENCES CITED

The following references are of record in the file of this patent:

UNITED STATES PATENTS

| Number | Name | Date |
|---|---|---|
| 1,941,001 | Hansell | Dec. 26, 1933 |
| 2,100,204 | Shore | Nov. 23, 1937 |
| 2,157,478 | Burdhardt et al. | May 9, 1939 |
| 2,172,539 | Kimmich | Sept. 12, 1939 |
| 2,302,289 | Bramston-Cook | Nov. 17, 1942 |